(12) United States Patent
Welton

(10) Patent No.: US 9,714,560 B2
(45) Date of Patent: Jul. 25, 2017

(54) PROTECTED SCALE INHIBITORS AND METHODS RELATING THERETO

(71) Applicant: Halliburton Energy Services, Inc., Houston, TX (US)

(72) Inventor: Thomas Donovan Welton, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 122 days.

(21) Appl. No.: 13/917,828

(22) Filed: Jun. 14, 2013

(65) Prior Publication Data

US 2014/0367101 A1    Dec. 18, 2014

(51) Int. Cl.

| | |
|---|---|
| *E21B 43/267* | (2006.01) |
| *C09K 8/528* | (2006.01) |
| *C09K 8/64* | (2006.01) |
| *C09K 8/68* | (2006.01) |
| *C09K 8/82* | (2006.01) |
| *C09K 8/88* | (2006.01) |
| *E21B 43/04* | (2006.01) |
| *C09K 8/80* | (2006.01) |
| *E21B 37/06* | (2006.01) |

(52) U.S. Cl.
CPC ............ *E21B 43/267* (2013.01); *C09K 8/528* (2013.01); *C09K 8/64* (2013.01); *C09K 8/685* (2013.01); *C09K 8/80* (2013.01); *C09K 8/82* (2013.01); *C09K 8/887* (2013.01); *E21B 37/06* (2013.01); *E21B 43/04* (2013.01)

(58) Field of Classification Search
CPC ........ E21B 43/255; C09K 8/601; C09K 8/845
USPC .................................................... 166/280.2
See application file for complete search history.

(56) References Cited

U.S. PATENT DOCUMENTS

| | | | |
|---|---|---|---|
| 5,905,061 A | 5/1999 | Patel | |
| 5,977,031 A | 11/1999 | Patel | |
| 6,379,612 B1 | 4/2002 | Reizer et al. | |
| 6,828,279 B2 | 12/2004 | Patel et al. | |
| 7,534,745 B2 | 5/2009 | Taylor et al. | |
| 7,645,723 B2 | 1/2010 | Kirsner et al. | |
| 7,665,517 B2 * | 2/2010 | Nguyen | E21B 37/06 166/249 |
| 7,696,131 B2 | 4/2010 | Oyler et al. | |

(Continued)

FOREIGN PATENT DOCUMENTS

| | | |
|---|---|---|
| WO | 2012/171858 A1 | 12/2012 |
| WO | 2014200757 A1 | 12/2014 |

OTHER PUBLICATIONS

International Search Report and Written Opinion for PCT/US2014/040651 dated Sep. 26, 2014.

(Continued)

*Primary Examiner* — Angela M DiTrani
*Assistant Examiner* — Ashish Varma
(74) *Attorney, Agent, or Firm* — McDermott Will & Emery LLP

(57) ABSTRACT

Treatment fluids suitable for use in subterranean operations may include a base fluid; a protected scale inhibitor; and at least one selected from the group consisting of (1) a metal crosslinker and a gelling agent, (2) an amine-based resin curing agent and an epoxy-based composition, and (3) any combination thereof, wherein the protected scale inhibitor is a scale inhibitor with at least one chelating group functionalized with a protecting group.

11 Claims, 1 Drawing Sheet

(56) References Cited

U.S. PATENT DOCUMENTS

| | | | |
|---|---|---|---|
| 2005/0159559 A1* | 7/2005 | Collins .................. | C09K 8/516 525/329.7 |
| 2008/0257551 A1* | 10/2008 | Morris ................... | C09K 8/528 166/270 |
| 2011/0237470 A1* | 9/2011 | Li .......................... | C09K 8/584 507/238 |
| 2012/0073821 A1 | 3/2012 | Holtsclaw et al. | |
| 2013/0023449 A1 | 1/2013 | Heath et al. | |

OTHER PUBLICATIONS

Protecting Groups Section of Chapter 17 from the Organic Chemistry On-Line Learning Center, Department of Chemistry, University of Calgary, downloaded from the Internet, Feb. 2015.

* cited by examiner

PROTECTED SCALE INHIBITORS AND METHODS RELATING THERETO

BACKGROUND

The present invention relates to treatment fluids that comprise protected scale inhibitors, and methods relating thereto.

Subterranean formations can often include complex mixtures of aliphatic hydrocarbons, aromatics, hetero-atomic molecules, anionic and cationic salts, acids, sands, silts, clays, and a vast array of other components. The conditions at which these components resided and experience during exploration and recovery operations are contributory factors to scale formation in the corresponding wellbores and related tools. As used herein, the term "scale" refers to a mineral or solid salt deposit that forms when the saturation of formation water to one or more minerals is affected by changing physical conditions (such as temperature, pressure, or composition), which causes minerals and salts previously in solution to precipitate into solids.

Scale deposits can form on any surface in a wellbore operation, including subterranean formations, production tubing, gravel packing screens, and other wellbore equipment. Scale can develop almost immediately, or build up over several months before becoming noticeable. The formation of scale can decrease permeability of the subterranean formation, reduce well productivity and shorten the lifetime of production equipment, and in extreme instances restrict or even completely choke production. In order to reduce or remove scale build-up, it is generally necessary to stop production, which is both time-consuming and costly.

The formation of scale is often controlled by the use of scale inhibitors. Scale inhibitors are typical compound, molecules, or polymers that have several moieties that chelate the minerals or salts that form scale, thereby inhibiting scale formation.

Oftentimes, an area of a subterranean formation where scale inhibition is desired is also an area where it is desirable to place particulates (e.g., in fracturing operations or gravel packing operations where particulate packs are formed). Further, in wellbore operations that place particulates, other additives like viscosifiers or resin systems are utilized. Viscosifiers typically provide for better suspensions and higher carrying capacity of the particulates in a treatment fluid, which, in turn, can yield more efficient and effective wellbore operations. Resin systems typically are used in conjunction with coatings on the particulates that can consolidate the particulates, make the particulates tacky, allow for formation fines to adhere to the particulates, and combinations thereof. Consolidated particulate packs can mitigate production the particulates and formation fines, which, in turn, enhances production efficiency.

However, some viscosifiers utilize metal crosslinkers and some resin systems utilize amine-based resin curing agents. These two additives can interact with chelating moieties of the scale inhibitor, which reduces the efficacy of the metal crosslinkers, amine-based resin curing agents, and scale inhibitors. To mitigate this deleterious interaction, the wellbore operations may have several injections of additives, which increases time and cost. Further, delayed-release solid particles have been developed to, in effect, release the scale inhibitor after the primary function of the metal crosslinkers and amine-based resin curing agents have been achieved. These delayed-release solid particles can, however, be expensive to manufacture. Therefore, a need exists for alternative technologies that allow for delaying the activity of scale inhibitors.

SUMMARY OF THE INVENTION

The present invention relates to treatment fluids that comprise protected scale inhibitors, and methods relating thereto.

One embodiment described herein includes a method that includes providing a treatment fluid comprising a base fluid, a protected scale inhibitor, and at least one selected from the group consisting of (1) a metal crosslinker and a gelling agent, (2) an amine-based resin curing agent and an epoxy-based composition, and (3) any combination thereof, wherein the protected scale inhibitor is a scale inhibitor with at least one chelating group functionalized with a protecting group; and introducing the treatment fluid into a wellbore penetrating a subterranean formation.

Another embodiment described herein includes a method that includes introducing a first treatment fluid into a wellbore penetrating a subterranean formation at a pressure sufficient to create or extend at least one fracture in the subterranean formation; and forming a particulate pack in the fracture with a second treatment fluid that comprises a base fluid, a protected scale inhibitor, a plurality of particulates, and at least one selected from the group consisting of (1) a metal crosslinker and a gelling agent, (2) an amine-based resin curing agent and an epoxy-based composition, and (3) any combination thereof, wherein the protected scale inhibitor is a scale inhibitor with at least one chelating group functionalized with a protecting group.

Yet another embodiment described herein includes a treatment fluid that includes a base fluid; a protected scale inhibitor; and at least one selected from the group consisting of (1) a metal crosslinker and a gelling agent, (2) an amine-based resin curing agent and an epoxy-based composition, and (3) any combination thereof, wherein the protected scale inhibitor is a scale inhibitor with at least one chelating group functionalized with a protecting group.

The features and advantages of the present invention will be readily apparent to those skilled in the art upon a reading of the description of the preferred embodiments that follows.

BRIEF DESCRIPTION OF THE DRAWINGS

The following FIGURES are included to illustrate certain aspects of the present invention, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

Figure 1:
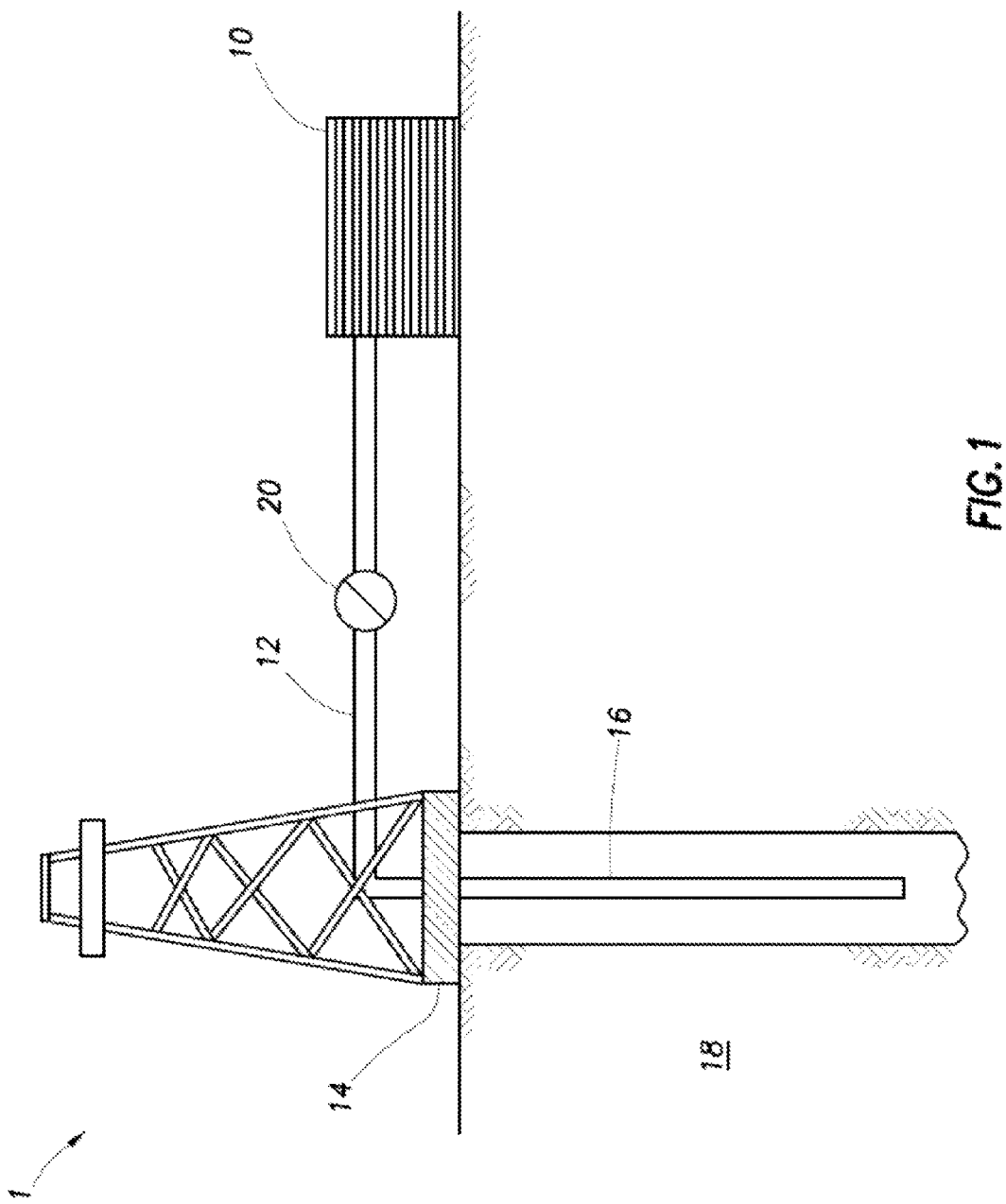
FIG. 1 shows an illustrative schematic of a system that can deliver treatment fluids of the present invention to a downhole location.

The present invention relates to treatment fluids that comprise protected scale inhibitors, and methods relating thereto.

The treatment fluids and methods described herein utilize a protected scale inhibitor to mitigate deleterious interactions with metal crosslinkers and amine-based resin curing agents. As used herein, the term "protected scale inhibitor" refers to a scale inhibitor having at least some of its chelating moieties functionalized with a protecting group. By protecting the chelating moieties of a scale inhibitor, the protected scale inhibitor is less effective, or in some instances with fully protected chelating moieties not effective, at chelating with metal crosslinkers and amine-based resin curing agents. Therefore, the metal crosslinkers and amine-based resin curing agents become, in effect, more effective at their respective purpose in the treatment fluid (e.g., crosslinking a polymer or gelling agent, or curing a resin), thereby allowing for less of the metal crosslinkers and amine-based resin curing agents to be used, which reduces cost and potential environmental impact.

Further, in some instances, the protecting group may be removed from the protected scale inhibitor (i.e., deprotecting the protected scale inhibitor), thereby leaving a scale inhibitor effective at inhibiting the formation of scale. In some instances, the protecting group may be chosen to provide for removal from the protected scale inhibitor over time (e.g., via hydrolysis), which allows for no additional additives or subsequent treatments to be needed to deprotect and render active the scale inhibitor. In some instances, the protecting group may also be chosen to provide for deprotection at a time after the metal crosslinkers and amine-based resin curing agents have substantially performed their function.

It should be noted that when "about" is provided herein at the beginning of a numerical list, "about" modifies each number of the numerical list. It should be noted that in some numerical listings of ranges, some lower limits listed may be greater than some upper limits listed. One skilled in the art will recognize that the selected subset will require the selection of an upper limit in excess of the selected lower limit.

In some embodiments, treatment fluids described herein may comprise a base fluid, protected scale inhibitors, and metal crosslinkers. In some embodiments, treatment fluids described herein may comprise a base fluid, protected scale inhibitors, and amine-based resin curing agents. In some embodiments, treatment fluids described herein may comprise a base fluid, protected scale inhibitors, metal crosslinkers, and amine-based resin curing agents.

Suitable base fluids for use in conjunction with the methods described herein may include, but not be limited to, aqueous-based fluids, water-in-oil emulsions, or oil-in-water emulsions. Suitable aqueous-based fluids (or water phases of an emulsion) may include fresh water, saltwater (e.g., water containing one or more salts dissolved therein), brine (e.g., saturated salt water), seawater, and any combination thereof. In some embodiments, the aqueous-based fluid may further comprises aqueous-miscible fluids, which may include, but are not limited to, alcohols (e.g., methanol, ethanol, n-propanol, isopropanol, n-butanol, sec-butanol, isobutanol, and t-butanol), glycerins, glycols (e.g., polyglycols, propylene glycol, and ethylene glycol), polyglycol amines, polyols, any derivative thereof, and any combination thereof. Suitable water-in-oil emulsions, also known as invert emulsions, may have an oil-to-water ratio from a lower limit of greater than about 50:50, 55:45, 60:40, 65:35, 70:30, 75:25, or 80:20 to an upper limit of less than about 100:0, 95:5, 90:10, 85:15, 80:20, 75:25, 70:30, or 65:35 by volume in the base fluid, and wherein the amount may range from any lower limit to any upper limit and encompasses any subset therebetween. Examples of suitable invert emulsions include those disclosed in U.S. Pat. No. 5,905,061 entitled "Invert Emulsion Fluids Suitable for Drilling" filed on May 23, 1997, U.S. Pat. No. 5,977,031 entitled "Ester Based Invert Emulsion Drilling Fluids and Muds Having Negative Alkalinity" filed on Aug. 8, 1998, U.S. Pat. No. 6,828,279 entitled "Biodegradable Surfactant for Invert Emulsion Drilling Fluid" filed on Aug. 10, 2001, U.S. Pat. No. 7,534,745 entitled "Gelled Invert Emulsion Compositions Comprising Polyvalent Metal Salts of an Organophosphonic Acid Ester or an Organophosphinic Acid and Methods of Use and Manufacture" filed on May 5, 2004, U.S. Pat. No. 7,645,723 entitled "Method of Drilling Using Invert Emulsion Drilling Fluids" filed on Aug. 15, 2007, and U.S. Pat. No. 7,696,131 entitled "Diesel Oil-Based Invert Emulsion Drilling Fluids and Methods of Drilling Boreholes" filed on Jul. 5, 2007, each of which are incorporated herein by reference in their entirety.

Suitable protected scale inhibitors include any scale inhibitor with the chelating groups functionalized with a protecting group. Examples of scale inhibitors may include, but are not limited to, aminophosphonic acids, aminophosphonates, hexamethylenediamine tetra(methylene phosphonic acid), diethylenetriamine penta(methylphophonic acid), bis(hexamethylene)triamine penta(methylene phosphonic acid), pentaethylene hexamineoctakis(methylene phosphonic acid), polyacrylic acid, phosphino carboxylic acid and acrylic copolymers, carboxymethyl inulin polymers, polyaspartic polymers, amino trimethylene phosphonic acid, ethylene diamine tetra(methylene phosphonic acid), 1-hydroxy ethylidene-1,1-diphosphonic acid, 2-hydroxyphosphonocarboxylic acid, 2-phosphonobutane-1,2,4-tricarboxylic acid, ethylenediaminetetrakis(methylene phosphonate), hexamethylenediamine tetrakis(methylene phosphonate), poly maleic acid, carboxylate sulphonate copolymer, carboxylate/sulfonate copolymer, sodium acrylate homopolymers, acrylic acid/2-acrylamido-2-methylpropane sulfonic acid copolymers, sulphonated styrene/maleic acid polymers, phosphino carboxylic acid polymers, acrylic acid/maleic acid copolymers, sulphonated phosphino carboxylic acid copolymers, carboxylate/sulphonate/maleic terpolymers, acrylic acid/acrylamide arylamide copolymers, acrylic acid homopolymers, phosphino carboxylic acid and acrylic terpolymers, and the like, and any combination thereof.

The protecting groups described herein may be carboxylic acid protecting groups. Carboxylic acid protecting groups may, in some embodiments, be enzymatically cleavable esters, substituted methyl esters, 2-substituted ethyl esters, 2,6-dialkylphenyl esters, benzyl esters, substituted benzyl esters, silyl esters, amides, hydrazines, and stannyl esters. Examples of carboxylic acid protecting groups may include, but are not limited to, heptyl, 2-N-(morpholino)ethyl, choline, (methoxyethoxy)ethyl, methoxyethyl, methyl, methoxyethyl, methyl, substituted methyl esters 9-fluorenylmethyl, methoxymethyl, methoxyethoxymethyl, methylthiomethyl, tetrahydropyranyl, tetrahydrofuranyl, 2-(trimethylsilyl)ethoxymethyl, benzyloxymethyl, triisopropylsiloxymethyl, pivaloyloxymethyl, 566 phenylacetoxymethyl, triisopropylsilylmethyl, cyanomethyl, acetol, phenacyl, p-bromophenacyl, p-methoxyphenacyl, 3,4,5-trimethoxyphenacyl, 2,5-dimethylphenacyl, desyl, carboxamidomethyl, p-azobenzenecarboxamidomethyl, 6-bromo-7-hydroxycoumarin-4-ylmethyl, N-phthalimidomethyl, α-methylphenacyl, ω-chloroalkyl, 2,2,2-trichloroethyl, 2-haloethyl, 2-(trimethylsilyl)ethyl, (2-methyl-2-trimethylsilyl)ethyl, (2-phenyl-2-trimethylsilyl)ethyl, 2-methylthioethyl, 1,3-dithianyl-2-methyl, 2-(p-nitrophenylsulfenyl)ethyl, 2-(p-toluenesulfonyl)ethyl, 2-(2'-pyridyl)ethyl, 2-(diphenylphosphino)ethyl, (p-methoxyphenyl)ethyl, 1-methyl-1-phenylethyl, 2-(4-acetyl-2-nitrophenyl)ethyl, 1-[2-(2-hydroxyalkyl)phenyl]ethanone, 2-cyanoethyl, t-butyl, 3-methyl-3-pentyl, dicyclopropylmethyl, 2,4-dimethyl- 3-pentyl, cyclopentyl, cyclohexyl, allyl, methallyl, 2-methylbut-3-en-2-yl, 3-methylbut-2-enyl, 3-buten-1-yl, 4-(trimethylsilyl)-2-buten-1-yl, cinnamyl, α-methylcinnamyl, prop-2-ynyl(propargyl), phenyl, 2,6-dimethylphenyl, 2,6-diisopropylphenyl, 2,6-di-t-butyl-4-methylphenyl, 2,6-di-t-butyl-4-methoxyphenyl, p-(methylthio)phenyl, pentafluorophenyl, 2-(dimethylamino)-5-nitrophenyl, benzyl, triphenylmethyl, 2-chlorophenyldiphenylmethyl, 2,3,4,4',4'',5,6-heptafluorotriphenylmethyl, diphenylmethyl, bis(o-nitrophenyl)methyl, 9-anthrylmethyl, 2-(9,10-dioxo)anthrylmethyl, 5-dibenzosuberyl, 1-pyrenylmethyl, 2-(trifluoromethyl)-6-chromonylmethyl, 2,4,6-trimethylbenzyl, p-bromobenzyl, o-nitrobenzyl, p-nitrobenzyl, p-methoxybenzyl, 2,6-dimethoxybenzyl, 4-(methylsulfinyl)benzyl, 4-sulfobenzyl, 4-azidomethoxybenzyl, 4-{N-[1-(4,4-dimethyl-2,6-dioxocyclohexylidene)-3-methylbutyl]amino}benzyl, piperonyl, 4-picolyl, p-polymer-benzyl, 2-naphthylmethyl, 3-nitro-2-naphthylmethyl, 4-quinolylmethyl, 8-bromo-7-hydroxyquinoline-2-ylmethyl, 2-nitro-4,5-dimethoxybenzyl, 1,2,3,4-tetrahydro-1-naphthyl, silyl esters trimethylsilyl, triethylsilyl, t-butyldimethylsilyl, t-butyldiphenylsilyl, i-propyldimethylsilyl, phenyldimethylsilyl, di-t-butylmethylsilyl, triisopropylsilyl, tris(2,6-diphenylbenzyl)silyl, activated esters thiol, amides N,N-dimethyl, pyrrolidinyl, piperidinyl, 5,6-dihydrophenanthridinyl, o-nitroanilide, N-7-nitroindolyl, N-8-nitro-1,2,3,4-tetrahydroquinolyl, 2-(2-aminophenyl)acetaldehyde dimethyl acetal amide, p-polymer-benzenesulfonamide, hydrazides N-phenyl, N,N'-dimethyl, N,N'-diisopropyl, phenyl group, triethylstannyl, tri-n-butylstannyl, oxazoles, 2-alkyl-1,3-oxazoline, 4-alkyl-5-oxo-1,3-oxazolidine, 2,2-bistrifluoromethyl-4-alkyl-5-oxo-1,3-oxazolidine, 2,2-dimethyl-4-alkyl-2-sila-5-oxo-1,3-oxazolidine, 2,2-difluoro-1,3,2-oxazaborolidin-5-one, 5-alkyl-4-oxo-1,3-dioxolane, dioxanones, ortho esters, braun ortho ester, pentaaminocobalt(iii) complex, tetraalkylammonium salts, and the like.

The protecting groups described herein may be phosphoric acid protecting groups. In some instances, phosphoric acid protecting groups may form alkyl phosphates, 2-substituted ethyl phosphates, haloethyl phosphates, benzyl phosphates, phenyl phosphates, and amidates. Examples of phosphoric acid protecting groups may include, but are not limited to, methyl, ethyl, isopropyl, cyclohexyl, t-butyl, 1-adamantyl, allyl, 2-trimethylsilylprop-2-enyl, hexafluoro-2-butyl, ethylene glycol derivative, 2-mercaptoethanol derivative, 3-pivaloyloxy-1,3-dihydroxypropyl derivative, 4-methylthio-1-butyl, 4-[n-methyl-N-(2,2,2-trifluoroacetyl)amino]butyl, 4-(n-trifluoroacetylamino)butyl, 2-(S-acetylthio)ethyl, 4-oxopentyl, 3-(N-t-butylcarboxamido)-1-propyl, 3-(pyridyl)-1-propyl, 2-[N-methyl-N-(2-pyridyl)]aminoethyl, 2-(N-formyl-N-methyl)aminoethyl, 2-(N-isopropyl-N-anisoylamino)ethyl, 2-[(1-naphthyl)carbamoyloxy]ethyl, 2-[N-isopropyl-N-(4-methoxybenzoyl)amino]ethyl, 2-cyanoethyl, 2-cyano-1,1-dimethylethyl, 4-cyano-2-butenyl, N-(4-methoxyphenyl)hydracrylamide, N-phenylhydracrylamide, N-phenylhydracrylamide derivatives, N-benzylhydracrylamide, N-benzylhydracrylamide derivatives, 2-(methyldiphenylsilyl)ethyl, 2-(trimethylsilyl)ethyl, 2-(triphenylsilyl)ethyl, 2-(4-nitrophenyl)ethyl, 2-(α-pyridyl)ethyl, 2-(4'-pyridyl)ethyl, 2-(3-arylpyrimidin-2-yl)ethyl, 2-(phenylthio)ethyl, 2-(4-nitrophenyl)thioethyl, 2-(4-tritylphenylthio)ethyl, 2-[2-(monomethoxytrityloxy)ethylthio]ethyl, dithioethanol derivative, 2-(methylsulfonyl)ethyl, 2-(t-butylsulfonyl)ethyl, 2-(phenylsulfonyl)ethyl, 2-(benzylsulfonyl)ethyl, 2,2,2-trichloroethyl, 2,2,2-trichloro-1,1-dimethylethyl, 2,2,2-tribromoethyl, 2,3-dibromopropyl, 2,2,2-trifluoroethyl, 1,1,1,3,3,3-hexafluoro-2-propyl, benzyl, 4-methoxybenzyl, 4-nitrobenzyl, 2,4-dinitrobenzyl, 4-chlorobenzyl, 4-chloro-2-nitrobenzyl, 4-acyloxybenzyl, 1-oxido-4-methoxy-2-picolyl, fluorenyl-9-methyl, 2-(9,10-anthraquinonyl)methyl, 5-benzisoxazolylmethylene, arylmethyl phosphates diphenylmethyl, o-xylene derivatives, phenyl, 2-methylphenyl, 2,6-dimethylphenyl, 2-chlorophenyl, 4-chlorophenyl, 2,4-dichlorophenyl, 2,5-dichlorophenyl, 2,6-dichlorophenyl, 2-bromophenyl, 4-nitrophenyl, 4-chloro-2-nitrophenyl, 2-chloro-4-tritylphenyl, 2-methoxy-5-nitrophenyl, 1,2-phenylene, 4-tritylaminophenyl, 4-benzylaminophenyl, 1-methyl-2-(2-hydroxyphenyl)imidazole, 1-methyl-2-(2-hydroxyphenyl)imidazole derivatives, 8-quinolyl, 5-chloro-8-quinolyl, thiophenyl, salicylic acid, salicylic acid derivatives, pyrenylmethyl, benzoin, 3',5'-dimethoxybenzoin, 3',5'-dimethoxybenzoin derivatives, 4-hydroxyphenacyl, 4-methoxyphenacyl, 1-(2-nitrophenyl)ethyl, o-nitrobenzyl, 3,5-dinitrophenyl, anilidate, 4-triphenylmethylanilidate, [N-(2-trityloxy)ethyl]anilidate, p-(N,N-dimethylamino)anilidate, 3-(N,N-diethylaminomethyl)anilidate, p-anisidate, 2,2'-diaminobiphenyl derivative, n-propylamine and i-propylamine derivative, N,N'-dimethyl-(r,r)-1,2-diaminocyclohexyl, morpholine, ethoxycarbonyl, (dimethylthiocarbamoyl)thio, and the like.

In some instances, a protecting group may be suitable for use as a carboxylic acid protecting group and a phosphoric acid protecting group.

In some embodiments, the protected scale inhibitors may be protected from a lower limit of from about 50%, 65%, 75%, or 85% to an upper limit of about 100%, 95%, 90%, 85%, or 75% (i.e., the percent of the chelating groups functionalized with a protecting group), and wherein the amount of protection may range from any lower limit to any upper limit and encompass any subset therebetween.

In some embodiments, the protected scale inhibitors may be present in a treatment fluid in an amount ranging from a lower limit of from about 0.0015%, 0.005, 0.01%, 0.05%, 0.1%, or 1% by weight of the treatment fluid to an upper limit of about 10%, 5%, or 1% by weight of the treatment fluid, and wherein the amount may range from any lower limit to any upper limit and encompass any subset therebetween.

Typically metal crosslinkers are utilized in conjunction with gelling agents. In some embodiments, treatment fluids described herein may comprise a base fluid, protected scale inhibitors, metal crosslinkers, and gelling agents. In many instances, boron-containing crosslinkers minimally interact with scale inhibitors. As such, in preferred embodiments, treatment fluids described herein may comprise a base fluid, protected scale inhibitors, metal crosslinkers, and gelling agents, wherein the metal crosslinker comprises a crosslinker that does not comprise boron. It should be noted, that the treatment fluid may further comprise a boron-containing crosslinker in some instances.

Suitable metal crosslinkers may include, but are not limited to, magnesium ions, zirconium IV ions, titanium IV ions, aluminum ions, antimony ions, chromium ions, iron ions, copper ions, magnesium ions, and zinc ions. These ions may be provided by providing any compound that is capable of producing one or more of these ions. Examples of such compounds include, but are not limited to, ferric chloride, magnesium oxide, zirconium lactate, zirconium triethanol amine, zirconium lactate triethanolamine, zirconium carbonate, zirconium acetylacetonate, zirconium malate, zirconium citrate, zirconium diisopropylamine lactate, zirconium glycolate, zirconium triethanol amine glycolate, zirconium lactate glycolate, titanium lactate, titanium malate, titanium citrate, titanium ammonium lactate, titanium triethanolamine, and titanium acetylacetonate, aluminum lactate, aluminum citrate, antimony compounds, chromium compounds, iron compounds, copper compounds, zinc compounds, iron compounds, and combinations thereof.

In some embodiments, the metal crosslinkers may be present in a treatment fluid in an amount ranging from a lower limit of from about 0.005%, 0.01%, or 0.1% by weight of the treatment fluid to an upper limit of about 1%, 0.5%, or 0.1% by weight of the treatment fluid, and wherein the amount may range from any lower limit to any upper limit and encompass any subset therebetween. One of ordinary skill in the art, with the benefit of this disclosure, will recognize the appropriate amount of crosslinking agent to include in a treatment fluid described herein based on, among other things, the temperature conditions of a particular application, the type of gelling agents used, the molecular weight of the gelling agents, the desired degree of viscosification, and/or the pH of the treatment fluid.

Typically amine-based resin curing agents are utilized in conjunction with epoxy-based compositions. In some embodiments, treatment fluids described herein may comprise a base fluid, protected scale inhibitors, amine-based resin curing agents, and epoxy-based compositions. Suitable amine-based resin curing agents may include, but are not limited to, aliphatic amines, aromatic amines, partially reduced aromatic amines, and the like, and any combination thereof. Specific examples of amine-based resin curing agents may include, but are not limited to, 4,4-diaminodiphenylsulfone, 3,3-diamino-diphenylsulfone, methylenedianiline, triethylenetetraamine, ethylenediamine, N-cocoalkyltrimethylenediamine, isophoronediamine, diethyltoluenediamine, and tris(dimethylaminomethylphenol), and the like, and any combination thereof.

In some embodiments, the amine-based resin curing agents may be present in a treatment fluid in an amount ranging from a lower limit of from about 0.05%, 0.1%, or 1% by weight of the treatment fluid to an upper limit of about 10%, 5%, or 1% by weight of the treatment fluid, and wherein the amount may range from any lower limit to any upper limit and encompass any subset therebetween. One of ordinary skill in the art, with the benefit of this disclosure, will recognize the appropriate amount of amine-based resin curing agents to include in a treatment fluid described herein based on, among other things, the temperature conditions of a particular application, the type of epoxy-based compositions used, the concentration of the epoxy-based compositions, the desired degree of hardening, and/or the pH of the treatment fluid. In some embodiments, the scale inhibitor is protected with an amine that when released will act as a resin curing agent.

In some embodiments, the treatment fluids described herein may further comprise a plurality of particulates (e.g., for use as proppants and/or gravel particulates). Suitable particulates may comprise any material suitable for use in subterranean operations. Suitable materials for these particulates include, but are not limited to, sand, bauxite, ceramic materials, glass materials, polymer materials, polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, and combinations thereof. Suitable composite particulates may comprise a binder and a filler material wherein suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, and combinations thereof. The mean particulate size generally may range from about 2 mesh to about 400 mesh on the U.S. Sieve Series; however, in certain circumstances, other mean particulate sizes may be desired and will be entirely suitable for practice of the present invention. In particular embodiments, preferred mean particulates size distribution ranges are one or more of 6/12, 8/16, 12/20, 16/30, 20/40, 30/50, 40/60, 40/70, or 50/70 mesh.

In some embodiments, the particulates may be present in the treatment fluids in an amount in the ranging from a lower limit of about 0.5 pounds per gallon ("ppg"), 1 ppg, or 5 ppg by volume of the treatment fluid to an upper limit of about 30 ppg, 20 ppg, or 10 ppg by volume of the treatment fluid, and wherein the amount may range from any lower limit to any upper limit and encompasses any subset therebetween.

In some embodiments, the treatment fluids described herein may optionally further comprise additives. Suitable additives may include, but are not limited to, weighting agents, inert solids, fluid loss control agents, emulsifiers, dispersion aids, corrosion inhibitors, emulsion thinners, emulsion thickeners, viscosifying agents, gelling agents, surfactants, lost circulation materials, foaming agents, gases, pH control additives, breakers, biocides, crosslinkers, stabilizers, chelating agents, scale inhibitors, gas hydrate inhibitors, mutual solvents, oxidizers, reducers, friction reducers, clay stabilizing agents, and the like, and any combination thereof. One of ordinary skill in the art should understand which additives and at what concentration should be included in the treatment fluid for use in a desired method.

The treatment fluids described herein may be suitable for use in a plurality of wellbore operation where metal crosslinkers and/or amine-based curing agents are utilized. Some embodiments may involve introducing a treatment fluid described herein (e.g., comprising a base fluid, protected scale inhibitors, and at least one of (1) metal crosslinkers and gelling agents or (2) amine-based resin curing agents and epoxy-based compositions) into a wellbore penetrating a subterranean formation. While, such treatment fluids may be utilized in several wellbore operations, the wellbore operations where these combinations are most often encountered are fracturing operations and gravel packing operations.

Some embodiments may involve introducing a pad fluid into a wellbore penetrating a subterranean formation at a pressure sufficient to create or extend at least one fracture in the subterranean formation; and forming a particulate pack in the fracture with a proppant slurry comprising a plurality of particulates. The pad fluid and the proppant slurry of these operations may independently be a treatment fluid described herein (e.g., comprising a base fluid, protected scale inhibitors, and at least one of (1) metal crosslinkers and gelling agents or (2) amine-based resin curing agents and epoxy-based compositions). It should be noted that the composition of the pad fluid and the proppant slurry may have the same or different components and each component may independently be at the same or different concentrations in the two fluids.

Some embodiments may further involve inhibiting scale formation in the wellbore and/or subterranean formation by deprotecting the protected scale inhibitors. Deprotection of the protected scale inhibitors may, in some embodiments, be achieved at the temperatures of some subterranean formations. Further, deprotection of the protected scale inhibitors may be achieved by reducing the pH of the treatment fluid.

In some instances, a combination of pH and temperature may be used to achieve deprotection of the protected scale inhibitors.

Some embodiments may further involve producing hydrocarbons from the subterranean formation.

Some embodiments may involve introducing a gravel packing fluid into a wellbore penetrating a subterranean formation, the gravel pacing fluid comprising a base fluid, protected scale inhibitors, a plurality of particulates, and at least one of (1) metal crosslinkers and gelling agents or (2) amine-based resin curing agents and epoxy-based compositions; and forming a gravel pack in an annulus within a wellbore (e.g., between the wellbore and a screen disposed therein). Some embodiments may further involve inhibiting scale formation in the wellbore and/or subterranean formation by deprotecting the protected scale inhibitors. Some embodiments may further involve producing hydrocarbons from the subterranean formation.

In various embodiments, systems configured for delivering the treatment fluids described herein to a downhole location are described. In various embodiments, the systems can comprise a pump fluidly coupled to a tubular, the tubular containing a treatment fluid comprising a base fluid; a protected scale inhibitor; and at least one selected from the group consisting of (1) a metal crosslinker and a gelling agent, (2) an amine-based resin curing agent and an epoxy-based composition, and (3) any combination thereof, wherein the protected scale inhibitor is a scale inhibitor with at least one chelating group functionalized with a protecting group.

The pump may be a high pressure pump in some embodiments. As used herein, the term "high pressure pump" will refer to a pump that is capable of delivering a fluid downhole at a pressure of about 1000 psi or greater. A high pressure pump may be used when it is desired to introduce the treatment fluid to a subterranean formation at or above a fracture gradient of the subterranean formation, but it may also be used in cases where fracturing is not desired. In some embodiments, the high pressure pump may be capable of fluidly conveying particulate matter, such as proppant particulates, into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the treatment fluid to the high pressure pump. In such embodiments, the low pressure pump may "step up" the pressure of the treatment fluid before it reaches the high pressure pump.

In some embodiments, the systems described herein can further comprise a mixing tank that is upstream of the pump and in which the treatment fluid is formulated. In various embodiments, the pump (e.g., a low pressure pump, a high pressure pump, or a combination thereof) may convey the treatment fluid from the mixing tank or other source of the treatment fluid to the tubular. In other embodiments, however, the treatment fluid can be formulated offsite and transported to a worksite, in which case the treatment fluid may be introduced to the tubular via the pump directly from its shipping container (e.g., a truck, a railcar, a barge, or the like) or from a transport pipeline. In either case, the treatment fluid may be drawn into the pump, elevated to an appropriate pressure, and then introduced into the tubular for delivery downhole.

FIG. 1 shows an illustrative schematic of a system that can deliver treatment fluids of the present invention to a downhole location, according to one or more embodiments. It should be noted that while FIG. 1 generally depicts a land-based system, it is to be recognized that like systems may be operated in subsea locations as well. As depicted in FIG. 1, system 1 may include mixing tank 10, in which a treatment fluid of the present invention may be formulated. The treatment fluid may be conveyed via line 12 to wellhead 14, where the treatment fluid enters tubular 16, tubular 16 extending from wellhead 14 into subterranean formation 18. Upon being ejected from tubular 16, the treatment fluid may subsequently penetrate into subterranean formation 18. Pump 20 may be configured to raise the pressure of the treatment fluid to a desired degree before its introduction into tubular 16. It is to be recognized that system 1 is merely exemplary in nature and various additional components may be present that have not necessarily been depicted in FIG. 1 in the interest of clarity. Non-limiting additional components that may be present include, but are not limited to, supply hoppers, valves, condensors, adapters, joints, gauges, sensors, compressors, pressure controllers, pressure sensors, flow rate controllers, flow rate sensors, temperature sensors, and the like.

Although not depicted in FIG. 1, the treatment fluid may, in some embodiments, flow back to wellhead 14 and exit subterranean formation 18. In some embodiments, the treatment fluid that has flowed back to wellhead 14 may subsequently be recovered and recirculated to subterranean formation 18.

It is also to be recognized that the disclosed treatment fluids may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 1.

One embodiment disclosed herein (Embodiment A) includes a treatment fluid that includes a base fluid; a protected scale inhibitor; and at least one selected from the group consisting of (1) a metal crosslinker and a gelling agent, (2) an amine-based resin curing agent and an epoxy-based composition, and (3) any combination thereof, wherein the protected scale inhibitor is a scale inhibitor with at least one chelating group functionalized with a protecting group.

Embodiment A may have one or more of the following additional elements in any combination: Element 1: the scale inhibitor being at least one selected from the group consisting of an aminophosphoric acid, an aminophosphonate, hexamethylenediamine tetra(methylene phosphonic acid), diethylenetriamine penta(methylphophonic acid), bis(hexamethylene)triamine penta(methylene phosphonic acid), pentaethylene hexamineoctakis(methylene phosphonic acid), polyacrylic acid, a phosphino carboxylic acid and acrylic copolymer, a carboxymethyl inulin polymer, a polyaspartic polymer, amino trimethylene phosphonic acid, ethylene diamine tetra(methylene phosphonic acid), 1-hydroxy ethylidene-1,1-diphosphonic acid, 2-hydroxyphosphonocarboxylic acid, 2-phosphonobutane-1,2,4-tricarboxylic acid, ethylenediaminetetrakis(methylene phosphonate), hexamethylenediamine tetrakis(methylene phosphonate), poly maleic acid, carboxylate sulphonate copolymer, carboxylate/sulfonate copolymer, a sodium acrylate homopolymer, an acrylic acid/2-acrylamido-2-methylpropane sulfonic acid copolymer, a sulphonated styrene/maleic acid polymer, a phosphino carboxylic acid polymer, an acrylic acid/maleic acid copolymer, a sulphonated phosphino carboxylic acid copolymer, a carboxylate/sulphonate/maleic terpolymer, an acrylic acid/acrylamide arylamide copolymer, an acrylic acid homopolymer, and a phosphino carboxylic acid and acrylic terpolymer; Element 2: the protecting group being a phosphoric acid protecting group or a carboxylic acid protecting group; Element 3: about 50% to about 100% of the chelating groups of the protected scale inhibitor are protected; Element 4: the protected scale inhibitor being present in an amount of about 0.0015% to about 10% by weight of the treatment fluid; Element 5: the metal crosslinker being present in an amount of about 0.005% to about 1% by weight of the treatment fluid; Element 6: the amine-based resin curing agent being present in an amount of about 0.05% to about 10% by weight of the treatment fluid; and Element 7: the treatment fluid further including a plurality of particulates.

By way of non-limiting example, exemplary combinations applicable to Embodiment A: Element 1 in combination with Element 2, Element 3 in combination with at least one of Element 1 or 2, at least one of Elements 4-7 in combination with any of the foregoing, and so on.

Additional embodiments disclosed herein include:

B. a method that includes introducing a treatment fluid according to Embodiment A optionally with at least one of Elements 1-7 into a wellbore penetrating a subterranean formation; and C. introducing a first treatment fluid into a wellbore penetrating a subterranean formation at a pressure sufficient to create or extend at least one fracture in the subterranean formation; and forming a particulate pack in the fracture with a second treatment fluid according to Embodiment A with Element 7 and optionally with at least one of Elements 1-6.

Embodiments B and C may have each independently one or more of the following additional elements in any combination, unless otherwise provided for: Element 8: introducing the treatment fluid (or second treatment fluid) at a pressure sufficient to extend or create at least one fracture in the subterranean formation; Element 9: including a plurality of particulates in the treatment fluid and forming a gravel pack comprising the particulates; and Element 10: inhibiting scale formation in the wellbore, the subterranean formation, or both by deprotecting the protected scale inhibitor.

By way of non-limiting example, exemplary combinations applicable to Embodiments B and C may include: Element 8 in combination with Element 10, Element 9 in combination with Element 10, and so on.

While compositions and methods are described in terms of "comprising" various components or steps, the compositions and methods can also "consist essentially of" or "consist of" the various components and steps. When "comprising" is used in a claim, it is open-ended.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claim, each numerical parameter should at least be construed in light of the number of reported significant digits and by applying ordinary rounding techniques.

One or more illustrative embodiments incorporating the invention disclosed herein are presented below. Not all features of an actual implementation are described or shown in this application for the sake of clarity. It is understood that in the development of an actual embodiment incorporating the present invention, numerous implementation-specific decisions must be made to achieve the developer's goals, such as compliance with system-related, business-related, government-related and other constraints, which vary by implementation and from time to time. While a developer's efforts might be complex and time-consuming, such efforts would be, nevertheless, a routine undertaking for those of ordinary skill the art having benefit of this disclosure.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A method comprising:
   providing a treatment fluid comprising a base fluid, a protected scale inhibitor, and at least one selected from the group consisting of (1) a metal crosslinker and a gelling agent, (2) an amine-based resin curing agent and an epoxy-based composition, and (3) any combination thereof, wherein the protected scale inhibitor is a scale inhibitor with at least one chelating group functionalized with a protecting group selected from the group consisting of an enzymatically cleavable ester, a substituted methyl ester, a 2-substituted ethyl ester, a 2,6-dialkylphenyl ester, a benzyl ester, a substituted benzyl ester, a silyl ester, an amide, a hydrazine, a stannyl ester, an alkyl phosphate, a 2-substituted ethyl phosphate, a haloethyl phosphate, a benzyl phosphate, a phenyl phosphate, and an amidate; and
   introducing the treatment fluid into a wellbore penetrating a subterranean formation;
   hydrolyzing the protected scale inhibitor to produce the scale inhibitor; and
   inhibiting scale formation in the wellbore, the subterranean formation, or both with the scale inhibitor,
   wherein more than 50% of the chelating groups of the protected scale inhibitor are protected.

2. The method of claim 1, wherein the scale inhibitor is at least one selected from the group consisting of an aminophosphonic acid, an aminophosphonate, hexamethylenediamine tetra(methylene phosphonic acid), diethylenetriamine penta (methylphophonic acid), bis (hexamethylene) triamine penta (methylene phosphonic acid), pentaethylene hexamineoctakis (methylene phosphonic acid), polyacrylic acid, a phosphino carboxylic acid and acrylic copolymer, a carboxymethyl inulin polymer, a polyaspartic polymer, amino trimethylene phosphonic acid, ethylene diamine tetra (methylene phosphonic acid), 1-hydroxy ethylidene-1,1-diphosphonic acid, 2-hydroxyphosphonocarboxylic acid, 2-phosphonobutane-1,2,4-tricarboxylic acid, ethylenediaminetetrakis (methylene phosphonate), hexamethylenediamine tetrakis (methylene phosphonate), poly maleic acid, carboxylate sulphonate copolymer, carboxylate/sulfonate copolymer, a sodium acrylate homopolymer, an acrylic acid/2-acrylamido-2-methylpropane sulfonic acid copolymer, a sulphonated styrene/maleic acid polymer, a phosphino carboxylic acid polymer, an acrylic acid/maleic acid copolymer, a sulphonated phosphino carboxylic acid copolymer, a carboxylate/sulphonate/maleic terpolymer, an acrylic acid/acrylamide arylamide copolymer, an acrylic acid homopolymer, and a phosphino carboxylic acid and acrylic terpolymer.

3. The method of claim 1, wherein the protected scale inhibitor is present in an amount of about 0.0015% to about 10% by weight of the treatment fluid.

4. The method of claim 1, wherein the metal crosslinker is present in an amount of about 0.005% to about 1% by weight of the treatment fluid.

5. The method of claim 1, wherein the amine-based resin curing agent is present in an amount of about 0.05% to about 10% by weight of the treatment fluid.

6. The method of claim 1, wherein introducing is at a pressure sufficient to extend or create at least one fracture in the subterranean formation.

7. The method of claim 1, wherein the treatment fluid further comprises a plurality of particulates.

8. The method of claim 7 further comprising:
   forming a gravel pack comprising the particulates in an annulus within the wellbore.

9. A method comprising:
   introducing a first treatment fluid into a wellbore penetrating a subterranean formation at a pressure sufficient to create or extend at least one fracture in the subterranean formation; and
   forming a particulate pack in the fracture with a second treatment fluid that comprises a base fluid, a protected scale inhibitor, a plurality of particulates, and at least one selected from the group consisting of (1) a metal crosslinker and a gelling agent, (2) an amine-based resin curing agent and an epoxy-based composition, and (3) any combination thereof, wherein the protected scale inhibitor is a scale inhibitor with at least one chelating group functionalized with a protecting group selected from the group consisting of an enzymatically cleavable ester, a substituted methyl ester, a 2-substituted ethyl ester, a 2,6-dialkylphenyl ester, a benzyl ester, a substituted benzyl ester, a silyl ester, an amide, a hydrazine, a stannyl ester, an alkyl phosphate, a 2-substituted ethyl phosphate, a haloethyl phosphate, a benzyl phosphate, a phenyl phosphate, and an amidate;
   hydrolyzing the protected scale inhibitor to produce the scale inhibitor; and
   inhibiting scale formation in the wellbore, the subterranean formation, or both with the scale inhibitor,
   wherein more than 50% of the chelating groups of the protected scale inhibitor are protected.

10. The method of claim 9, wherein the scale inhibitor is at least one selected from the group consisting of an aminophosphonic acid, an aminophosphonate, hexamethylenediamine tetra(methylene phosphonic acid), diethylenetriamine penta (methylphophonic acid), bis (hexamethylene) triamine penta (methylene phosphonic acid), pentaethylene hexamineoctakis (methylene phosphonic acid), polyacrylic acid, a phosphino carboxylic acid and acrylic copolymer, a carboxymethyl inulin polymer, a polyaspartic polymer, amino trimethylene phosphonic acid, ethylene diamine tetra (methylene phosphonic acid), 1-hydroxy ethylidene-1,1-diphosphonic acid, 2-hydroxyphosphonocarboxylic acid, 2-phosphonobutane-1,2,4-tricarboxylic acid, ethylenediaminetetrakis (methylene phosphonate), hexamethylenediamine tetrakis (methylene phosphonate), poly maleic acid, carboxylate sulphonate copolymer, carboxylate/sulfonate copolymer, a sodium acrylate homopolymer, an acrylic acid/2-acrylamido-2-methylpropane sulfonic acid copolymer, a sulphonated styrene/maleic acid polymer, a phosphino carboxylic acid polymer, an acrylic acid/maleic acid copolymer, a sulphonated phosphino carboxylic acid copolymer, a carboxylate/sulphonate/maleic terpolymer, an acrylic acid/acrylamide arylamide copolymer, an acrylic acid homopolymer, and a phosphino carboxylic acid and acrylic terpolymer.

11. A method comprising:
   introducing a treatment fluid into a wellbore penetrating a subterranean formation, the treatment fluid comprising a base fluid, a protected scale inhibitor, and at least one selected from the group consisting of (1) a metal crosslinker and a gelling agent, (2) an amine-based resin curing agent and an epoxy-based composition, and (3) any combination thereof, wherein the protected scale inhibitor is a scale inhibitor with at least one chelating group functionalized with a protecting group selected from the group consisting of heptyl, 2-N-(morpholino)ethyl, choline, (methoxyethoxy)ethyl, methoxyethyl, methyl, methoxyethyl, methyl, substituted methyl esters 9-fluorenylmethyl, methoxymethyl, methoxyethoxymethyl, methylthiomethyl, tetrahydropyranyl, tetrahydrofuranyl, 2-(trimethylsilyl)ethoxymethyl, benzyloxymethyl, triisopropylsiloxymethyl, pivaloyloxymethyl, 566 phenylacetoxymethyl, triisopropylsilylmethyl, cyanomethyl, acetol, phenacyl, p-bromophenacyl, p-methoxyphenacyl, 3,4,5-trimethoxyphenacyl, 2,5-dimethylphenacyl, desyl, carboxamidomethyl, p-azobenzenecarboxamidomethyl, 6-bromo-7-hydroxycoumarin-4-ylmethyl, N-phthalimidomethyl, α-methylphenacyl, ω-chloroalkyl, 2,2,2-trichloroethyl, 2-haloethyl, 2-(trimethylsilyl)ethyl, (2-methyl-2-trimethylsilyl)ethyl, (2-phenyl-2-trimethylsilyl)ethyl, 2-methylthioethyl, 1,3-dithianyl-2-methyl, 2-(p-nitrophenylsulfenyl)ethyl, 2-(p-toluenesulfonyl)ethyl, 2-(2'-pyridyl)ethyl, 2-(diphenylphosphino)ethyl, (p-methoxyphenyl)ethyl, 1-methyl-1-phenylethyl, 2-(4-acetyl-2-nitrophenyl)ethyl, 1-[2-(2-hydroxyalkyl)phenyl]ethanone, 2-cyanoethyl, t-butyl, 3-methyl-3-pentyl, dicyclopropylmethyl, 2,4-dimethyl-3-pentyl, cyclopentyl, cyclohexyl, allyl, methallyl, 2-methylbut-3-en-2-yl, 3-methylbut-2-enyl, 3-buten-1-yl, 4-(trimethylsilyl)-2-buten-1-yl, cinnamyl, α-methylcinnamyl, prop-2-ynyl (propargyl), phenyl, 2,6-dimethylphenyl, 2,6-diisopropylphenyl, 2,6-di-t-butyl-4-methylphenyl, 2,6-di-t-butyl-4-methoxyphenyl, p-(methylthio)phenyl, pentafluorophenyl, 2-(dimethylamino)-5-nitrophenyl, benzyl, triphenylmethyl, 2-chlorophenyldiphenylmethyl, 2,3,4,4',4'',5,6-heptafluorotriphenylmethyl, diphenylmethyl, bis(o-nitrophenyl)methyl, 9-anthrylmethyl, 2-(9,10-dioxo)anthrylmethyl, 5-dibenzosuberyl, 1-pyrenylmethyl, 2-(trifluoromethyl)-6-chromonylmethyl, 2,4,6-trimethylbenzyl, p-bromobenzyl, o-nitrobenzyl, p-nitrobenzyl, p-methoxybenzyl, 2,6-dimethoxybenzyl, 4-(methylsulfinyl)benzyl, 4-sulfobenzyl, 4-azidomethoxybenzyl, 4-{N-[1-(4,4-dimethyl-2,6-dioxocyclohexylidene)-3-methylbutyl]amino}benzyl, piperonyl, 4-picolyl, p-polymer-benzyl, 2-naphthylmethyl, 3-nitro-2-naphthylmethyl, 4-quinolylmethyl, 8-bromo-7-hydroxyquinoline-2-ylmethyl, 2-nitro-4,5-dimethoxybenzyl, 1,2,3,4-tetrahydro-1-naphthyl, silyl esters trimethylsilyl, triethylsilyl, t-butyldimethylsilyl, t-butyldiphenylsilyl, i-propyldimethylsilyl, phenyldimethylsilyl, di-t-butylmethylsilyl, triisopropylsilyl, tris(2,6-diphenylbenzyl)silyl, activated esters thiol, amides N,N-dimethyl, pyrrolidinyl, piperidinyl, 5,6-dihydrophenanthridinyl, o-nitroanilide, N-7-nitroindolyl, N-8-nitro-1,2,3,4-tetrahydroquinolyl, 2-(2-aminophenyl)acetaldehyde dimethyl acetal amide, p-polymer-benzenesulfonamide, hydrazides N-phenyl, N,N'-dimethyl, N,N'-diisopropyl, phenyl group, triethylstannyl, tri-n-butylstannyl, oxazoles, 2-alkyl-1,3-oxazoline, 4-alkyl-5-oxo-1,3-oxazolidine, 2,2-bistrifluoromethyl-4-alkyl-5-oxo-1,3-oxazolidine, 2,2-dimethyl-4-alkyl-2-sila-5-oxo-1,3-oxazolidine, 2,2-difluoro-1,3,2-oxazaborolidin-5-one, 5-alkyl-4-oxo-1,3-dioxolane, dioxanones, ortho esters, braun ortho ester, pentaaminocobalt(iii) complex, tetraalkylammonium salts, methyl, ethyl, isopropyl, cyclohexyl, t-butyl, 1-adamantyl, allyl, 2-trimethylsilylprop-2-enyl, hexafluoro-2-butyl, ethylene glycol derivative, 2-mercaptoethanol derivative, 3-pivaloyloxy-1,3-dihydroxypropyl derivative, 4-methylthio-1-butyl, 4-[n-methyl-N-(2,2,2-trifluoroacetyl)amino]butyl, 4-(n-trifluoroacetylamino)butyl, 2-(S-acetylthio)ethyl, 4-oxopentyl, 3-(N-t-butylcarboxamido)-1-propyl, 3-(pyridyl)-1-propyl, 2-[N-methyl-N-(2-pyridyl)]aminoethyl, 2-(N-formyl-N-methyl)aminoethyl, 2-(N-isopropyl-N-anisoylamino)ethyl, 2-[(1-naphthyl)carbamoyloxy]ethyl, 2-[N-isopropyl-N-(4-methoxybenzoyl)amino]ethyl, 2-cyanoethyl, 2-cyano-1,1-dimethylethyl, 4-cyano-2-butenyl, N-(4-methoxyphenyl)hydracrylamide, N-phenylhydracrylamide, N-phenylhydracrylamide derivatives, N-benzylhydracrylamide, N-benzylhydracrylamide derivatives, 2-(methyldiphenylsilyl)ethyl, 2-(trimethylsilyl)ethyl, 2-(triphenylsilyl)ethyl, 2-(4-nitrophenyl)ethyl, 2-(a-pyridyl)ethyl, 2-(4'-pyridyl)ethyl, 2-(3-arylpyrimidin-2-yl)ethyl, 2-(phenylthio)ethyl, 2-(4-nitrophenyl)thioethyl, 2-(4-tritylphenylthio)ethyl, 2-[2-(monomethoxytrityloxy)ethylthio]ethyl, dithioethanol derivative, 2-(methylsulfonyl)ethyl, 2-(t-butylsulfonyl)ethyl, 2-(phenylsulfonyl)ethyl, 2-(benzylsulfonyl)ethyl, 2,2,2-trichloroethyl, 2,2,2-trichloro-1,1-dimethylethyl, 2,2,2-tribromoethyl, 2,3-dibromopropyl, 2,2,2-trifluoroethyl, 1,1,1,3,3,3-hexafluoro-2-propyl, benzyl, 4-methoxybenzyl, 4-nitrobenzyl, 2,4-dinitrobenzyl, 4-chlorobenzyl, 4-chloro-2-nitrobenzyl, 4-acyloxybenzyl, 1-oxido-4-methoxy-2-picolyl, fluorenyl-9-methyl, 2-(9,10-anthraquinonyl)methyl, 5-benzisoxazolylmethylene, arylmethyl phosphates diphenylmethyl, o-xylene derivatives, phenyl, 2-methylphenyl, 2,6-dimethylphenyl, 2-chlorophenyl, 4-chlorophenyl, 2,4-dichlorophenyl, 2,5-dichlorophenyl, 2,6-dichlorophenyl, 2-bromophenyl, 4-nitrophenyl, 4-chloro-2-nitrophenyl, 2-chloro-4-tritylphenyl, 2-methoxy-5-nitrophenyl, 1,2-phenylene, 4-tritylaminophenyl, 4-benzylaminophenyl, 1-methyl-2-(2-hydroxyphenyl)imidazole, 1-methyl-2-(2-hydroxyphenyl)imidazole derivatives, 8-quinolyl, 5-chloro-8-quinolyl, thiophenyl, salicylic acid, salicylic acid derivatives, pyrenylmethyl, benzoin, 3',5'-dimethoxybenzoin, 3',5'-dimethoxybenzoin derivatives, 4-hydroxyphenacyl, 4-methoxyphenacyl, 1-(2-nitrophenyl)ethyl, o-nitrobenzyl, 3,5-dinitrophenyl, anilidate, 4-triphenylmethylanilidate, [N-(2-trityloxy)ethyl]anilidate, p-(N,N-dimethylamino)anilidate, 3-(N,N-diethylaminomethyl)anilidate, p-anisidate, 2,2'-diaminobiphenyl derivative, n-propylamine and i-propylamine derivative, N,N'-dimethyl-(r,r)-1,2-diaminocyclohexyl, morpholine, ethoxycarbonyl, and (dimethylthiocarbamoyl)thio; and reducing a pH of the treatment fluid, thereby deprotecting the protected scale inhibitor while the protected scale inhibitor is in the wellbore, the subterranean formation, or both so as to inhibit scale formation therein, wherein more than 50% of the chelating groups of the protected scale inhibitor are protected.

\* \* \* \* \*

UNITED STATES PATENT AND TRADEMARK OFFICE
CERTIFICATE OF CORRECTION

PATENT NO. : 9,714,560 B2  
APPLICATION NO. : 13/917828  
DATED : July 25, 2017  
INVENTOR(S) : Thomas Donovan Welton Page 1 of 1

It is certified that error appears in the above-identified patent and that said Letters Patent is hereby corrected as shown below:

In the Claims

In Column 16, Line 20:
Replace "2-(a-pyridyl)ethyl", with --2-($\alpha$-pyridyl)ethyl--.

Signed and Sealed this
Nineteenth Day of September, 2017

Joseph Matal
*Performing the Functions and Duties of the*
*Under Secretary of Commerce for Intellectual Property and*
*Director of the United States Patent and Trademark Office*